(12) United States Patent
Espinosa Cardenas et al.

(10) Patent No.: US 10,713,944 B2
(45) Date of Patent: Jul. 14, 2020

(54) VEHICLE-TO-VEHICLE DYNAMIC PARKING FINDER ASSISTANT

(71) Applicant: Continental Automotive Systems, Inc., Auburn Hills, MI (US)

(72) Inventors: Enrique Espinosa Cardenas, Zapopan (MX); Salvador Salcedo Garcia, Guadalajara (MX); Oliver Rodriguez Nunez, Zapopan (MX); Luis Gonzalez Argentin, Zapopan (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/227,043

(22) Filed: Dec. 20, 2018

(65) Prior Publication Data
US 2019/0197898 A1 Jun. 27, 2019

Related U.S. Application Data

(60) Provisional application No. 62/610,504, filed on Dec. 26, 2017.

(51) Int. Cl.
*G08G 1/14* (2006.01)
*H04W 4/46* (2018.01)
*G08G 1/16* (2006.01)

(52) U.S. Cl.
CPC .............. *G08G 1/143* (2013.01); *G08G 1/146* (2013.01); *H04W 4/46* (2018.02); *G08G 1/162* (2013.01)

(58) Field of Classification Search
CPC .......... G08B 1/14; G08B 1/141; G08B 1/143; G08B 1/144; G08B 1/145; G08B 1/146;
(Continued)

(56) References Cited

U.S. PATENT DOCUMENTS 9,852,628 B2 12/2017 Hakeem et al.
9,940,838 B2 * 4/2018 Bhuiya .................. G06Q 10/02
(Continued)

FOREIGN PATENT DOCUMENTS

KR 20170103793 A 9/2017

OTHER PUBLICATIONS

J.P. Benson et al.; "Car-Park Management using Wireless Sensor Networks"; IEEE, 2006 1-4244-0419-3/06; pp. 588-595.
(Continued)

*Primary Examiner* — Van T Trieu

(57) ABSTRACT

A method of assisting a driver of a first vehicle to find an empty parking space, the method including: receiving at the first vehicle V2V communications from at least one other vehicle within a parking area of interest for the first vehicle; analyzing the received V2V communications from the at least one other vehicle to determine potential available parking spaces in the parking area of interest; displaying on a display in the first vehicle one or more available parking spaces in the parking area of interest. The V2V communications comprise dedicated short-range communications (DSRC) technology that includes broadcasting a basic safety message (BSM) up to ten times per second, each BSM indicating a vehicle location, a vehicle heading, and a vehicle speed of the vehicle transmitting the BSM.

8 Claims, 4 Drawing Sheets

(58) Field of Classification Search
CPC .... G08B 1/147; G08B 1/148; G06K 9/00812; H04W 4/40; H04W 4/44; H04W 4/46; H04W 4/48; H04W 4/08
See application file for complete search history.

(56) References Cited

U.S. PATENT DOCUMENTS

| | | |
|---|---|---|
| 10,023,231 B2 | 7/2018 | Ramanujam |
| 10,049,573 B1* | 8/2018 | Surnilla ................. G08G 1/091 |
| 2005/0195095 A1 | 9/2005 | Kato |
| 2011/0010443 A1 | 1/2011 | Nagatomo |
| 2015/0124096 A1 | 5/2015 | Koravadi |
| 2015/0161890 A1 | 6/2015 | Huntzicker |
| 2017/0025008 A1* | 1/2017 | Gignac ................. G08G 1/143 |
| 2017/0032402 A1* | 2/2017 | Patsiokas ........... G06Q 30/0266 |
| 2017/0045369 A1* | 2/2017 | Kim ................... G01C 21/3685 |
| 2018/0215374 A1 | 8/2018 | Lee et al. |

OTHER PUBLICATIONS

Zhanlin Ji et al.; "A Cloud-Based Car Parking Middleware for IoT-Based Smart Cities: Design and Implementation";Sensors 2014, ISSN 1424-8220, Published Nov. 25, 2014; pp. 22372-22393.
Ivan Ganchev et al.; "Intelligent Car Parking Locator Service"; International Journal "Information Technologies and Knowledge" vol. 2, 2008; pp. 166-173.

* cited by examiner

VEHICLE-TO-VEHICLE DYNAMIC PARKING FINDER ASSISTANT

BACKGROUND

Smart cities are emerging with an increasing capability to be instrumented with a diverse range of mobile and fixed sensors, this allows us to create wireless and wired networks to improve the interaction from Vehicle2I (Vehicle to Infrastructure), Vehicle2Vehicle (Vehicle to Vehicle) and H2I (Human to Infrastructure). These technologies enable a richer set of services based on IoT (Internet of Things) by creating ITSs (Intelligent Transport Systems). A standard infrastructure may be used to perform wireless communication from vehicles to a central management base for V2I or V2V applications.

This can be seen as a significant step towards a "Smart World"—an integration of smart environments to better understand our surroundings and to improve our wellbeing.

On the other hand, for automated private parking lots there exists Automated Storage and Retrieval System (AS/RS), and warehouse management systems. These systems increase the efficiency parking task by preventing time spent looking for an empty space. The implementation for those systems, however, requires a high cost infrastructure for the amount of sensors and mechanisms, which are used to verify whether a parking space is available and then to move and park a vehicle via the AS/RS.

The existing car parking systems implemented for ITSs (Intelligent Transportation Systems) in smart cities are not very efficient to the extent that there tend to be communication problems related to the phenomenon observed by the sensor network. Sensor nodes are currently deployed on the ground in the center of a parking spot. As vehicles have to drive over the sensor, it must have a low profile and this result in the antenna being placed only a few centimeters above ground. Such a placement in general reduces the communication range. If a vehicle is parked, a large metal object is placed above the antenna which obstructs communication dramatically and causes an unexpected entry to the system.

Furthermore, in current developments an infrastructure is used to perform communication from cars to a central management base, this results in a high cost associated with installing this technology.

The number of vehicles in cities is increasing. In crowded areas (malls, office buildings, etc) the difficulty to find a parking space is troublesome. Finding an empty space in busy urban areas is sometimes difficult.

In order to find a parking space drivers have to divide their attention, to identify which pedestrians are walking to their car to leave, to identify which vehicles are leaving and which ones have just arrived, and to drive around the parking lot. This makes the searching for parking space stressful, accident prone, and sometimes a frustrating and/or time-consuming process.

Techniques for assisting drivers to find parking spaces more efficiently would be an improvement.

BRIEF SUMMARY

Embodiments of the invention are directed to a method of assisting a driver of a first vehicle to find an empty parking space, the method including: receiving at the first vehicle V2V communications from at least one other vehicle within a parking area of interest for the first vehicle; analyzing the received V2V communications from the at least one other vehicle to determine potential available parking spaces in the parking area of interest; displaying on a display in the first vehicle one or more available parking spaces in the parking area of interest. The V2V communications comprise dedicated short-range communications (DSRC) technology that includes broadcasting a basic safety message (BSM) up to ten times per second, each BSM indicating a vehicle location, a vehicle heading, and a vehicle speed of the vehicle transmitting the BSM.

DETAILED DESCRIPTION

Figure 1:
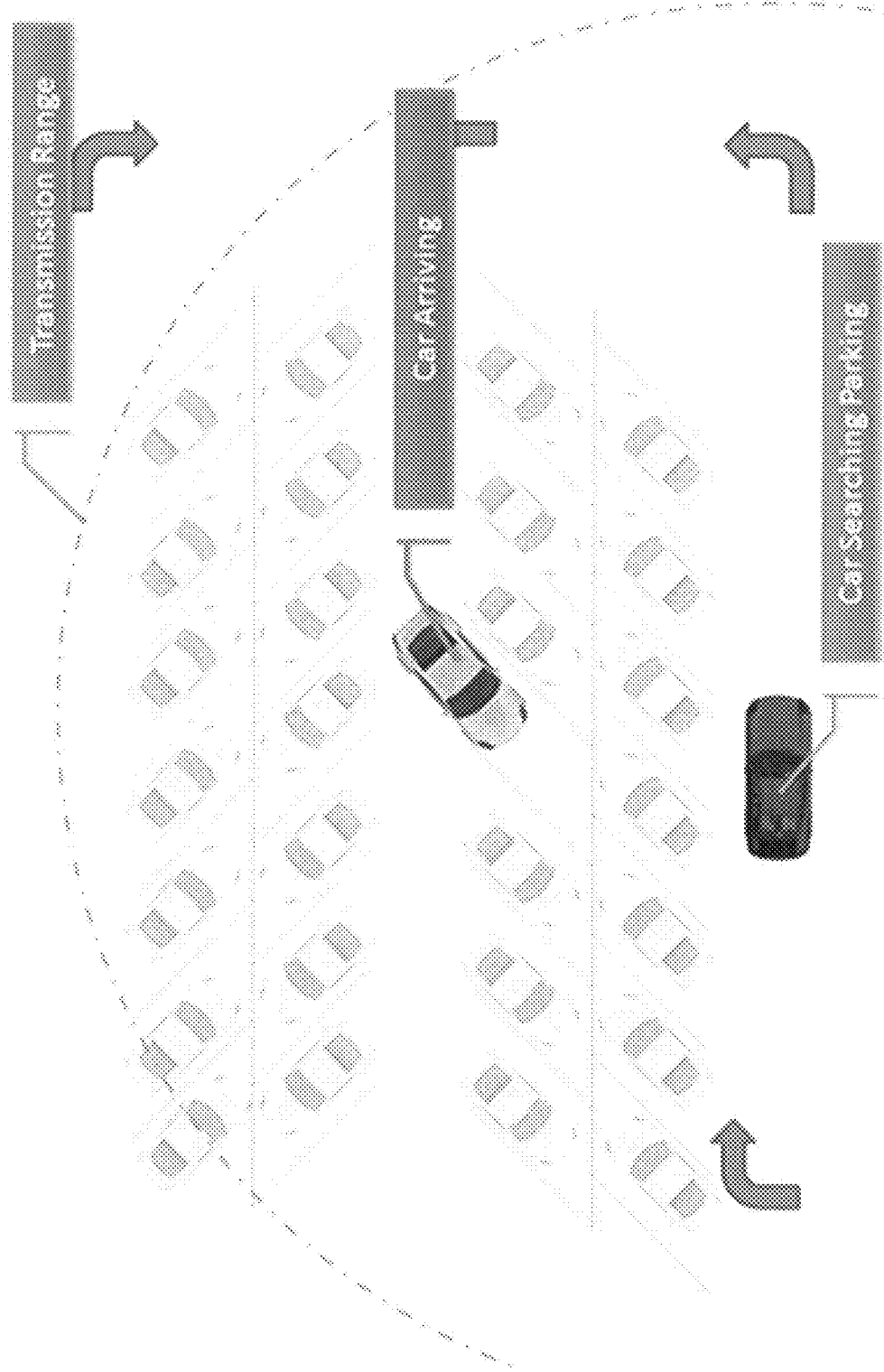
FIG. 1 shows a typical situation that illustrates how embodiments of the invention work.

Vehicular communication systems are networks in which vehicles and roadside units are the communicating nodes, providing each other with information, such as safety warnings and traffic information. They can be effective in avoiding accidents and traffic congestion. Both types of nodes are dedicated short-range communications (DSRC) devices, DSRC works in 5.9 GHz band with bandwidth of 75 MHz and approximate range of 1.000 meters (about 0.6 miles). Vehicular communications is usually developed as a part of intelligent transportation systems (ITS).

V2V (short for vehicle to vehicle) is an automobile technology designed to allow automobiles to "talk" to each other. The systems will use a region of the 5.9 GHz band set aside by the United States Congress in 1999, the unlicensed frequency also used by WiFi. V2V is also known as VANETs (vehicular ad hoc networks). It is a variation of MANETs (mobile ad hoc networks), with the emphasis being now the node is the vehicle.

NHTSA has proposed mandatory dedicated short-range communications (DSRC) V2V technology in new light vehicles. Under this proposed scheme, vehicles would broadcast a defined data packet, the "basic safety message" (BSM) up to ten times per second, indicating vehicle location, healing, and speed.

Embodiments of the invention assist a driver to find an empty parking space by using V2V information, GPS information, and/or a display device in the car. While active, embodiments of the invention analyze information from other cars and map where a car has started to send their V2X signals to identify which automobiles are likely candidates to leave their current parking spaces thereby identifying potential available parking spaces.

Embodiments of the invention may also inform a driver regarding which areas have a higher concentration of drivers looking for a parking spot and may suggest one or more searching areas with a relatively higher probability for actually finding an available parking space.

Embodiments of the invention use V2V communication to determine the position of others vehicles in a parking lot. Once a car enters a parking lot, the user can activate the DPFA (Dynamic Parking Finder Assistant) system to find possible empty spaces in a crowded parking lot.

The system will use V2V information to obtain the position of other vehicles in the V2V transmission range. To decide whether a car is arriving to or leaving from a parking area, respective position histories of other vehicles may be used. And whether a transmitter (other vehicle) is a "new entity" in the transmission range, this means that the car has been turned on recently, and it is a likely candidate for leaving the parking area. If the car is no longer in the range, that means that the place is not empty, and the car is arriving; or the car is out of range.

In accordance with embodiments of the invention, when a car seeking a parking spots starts to receive V2X signals from a vehicle, the car that is looking for a parking spot tracks the location of the vehicle that is transmitting its V2X signal. By tracking the location of the vehicle from which V2X signals are being received, the car that is seeking a parking spot can determine whether it is more likely that: (1) the vehicle from which V2X signals are being received is stationary and then starts moving, in which case, that vehicle has likely left a parking spot available; or (2) the vehicle from which V2X signals are being received is moving when the car seeking a parking spot starts to receive the V2X signal from the vehicle, in which case it is more likely that the vehicle from which V2X signals are being received has just come into V2X range of the car seeking a parking spot and, therefore, the vehicle from which V2X signals are being received is also seeking a parking spot, or at least has not just left a parking spot having a known location available.

Embodiments of the invention may remove available parking spots upon detecting that another vehicle is waiting to park near an otherwise available parking spot.

Embodiments of the invention advantageously don't require additional hardware modules in the car or any special infrastructure. When multiple drivers are each simultaneously seeking a parking spot in a limited parking area, a driver who is using this system will be able to find an available parking spot more quickly, efficiently, precisely, and effectively, than the driver would be able to without using the system.

FIG. 1 shows a typical situation that illustrates how embodiments of the invention work. In this example the parking area is almost full. The last empty space is occupied for the car arriving.

Figure 2:
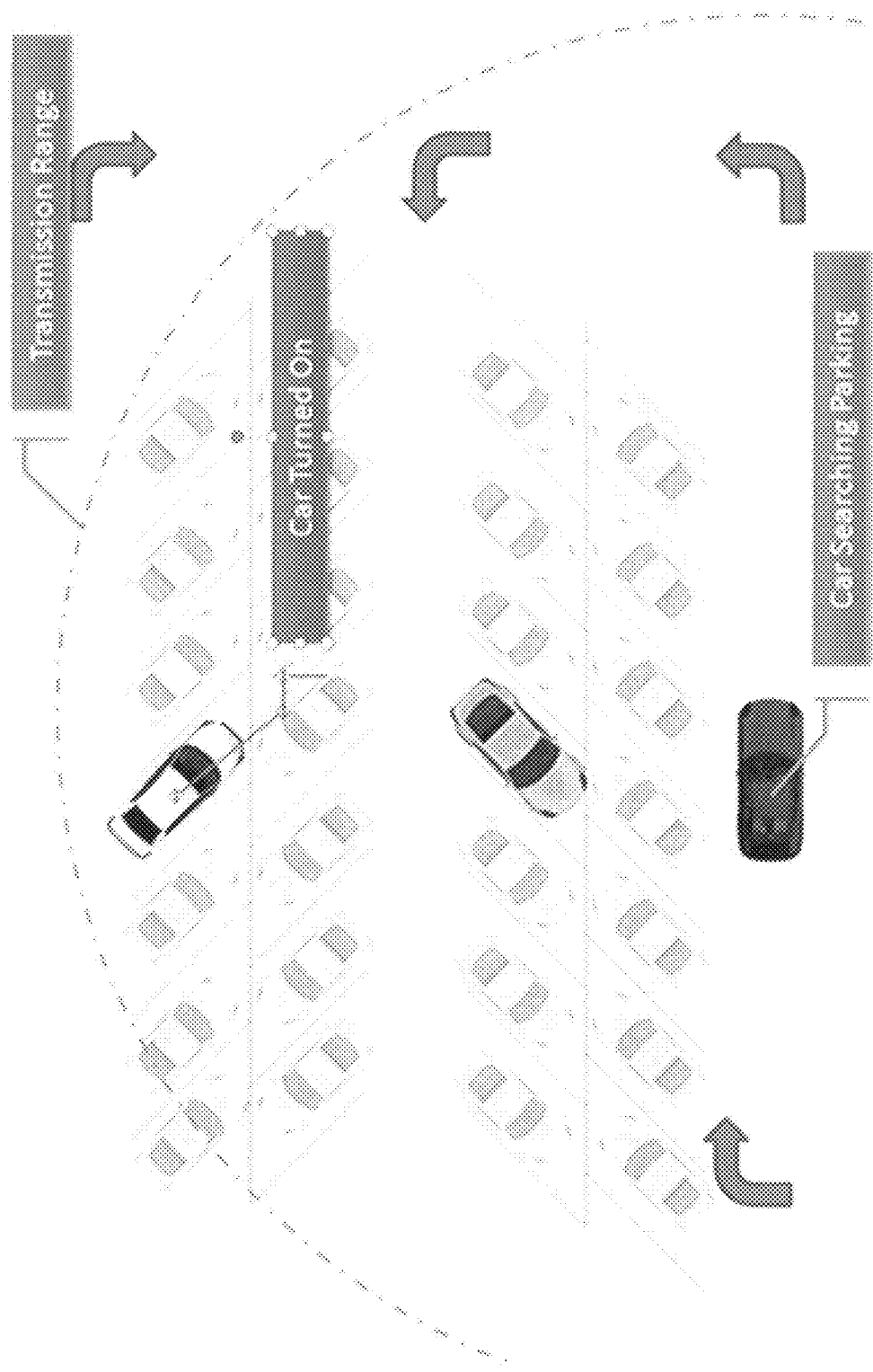
FIG. 2 depicts a situation in which inside the transmission range a new car has been turned on and has started to transmit its position V2V.

FIG. 2 depicts a situation in which inside the transmission range a new car has been turned on and has started to transmit its position V2V.

Figure 3:
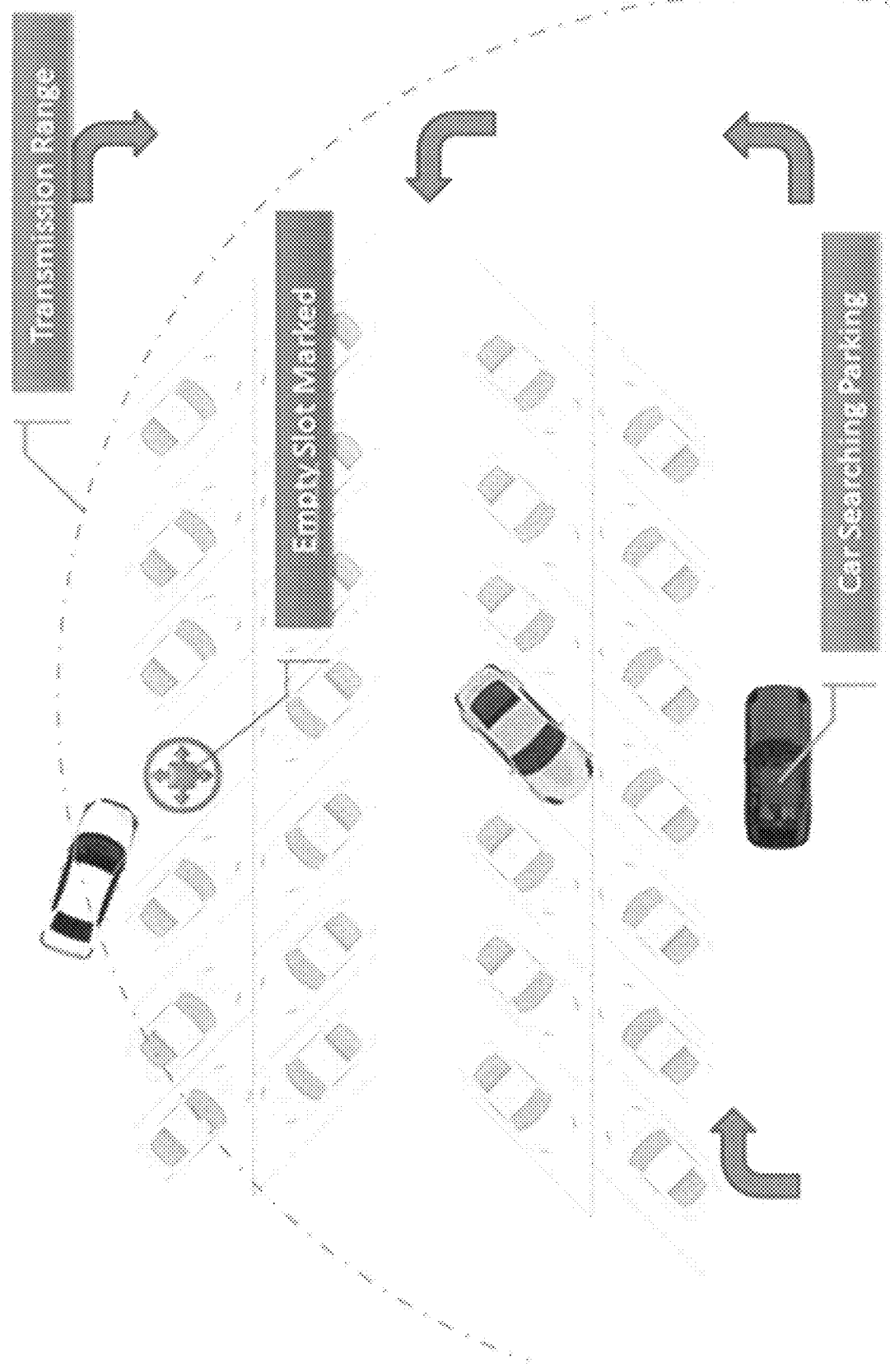
FIG. 3 shows how the new empty space is marked, the start position of the new entity is stored where the car was detected upon being turned on, and that position is used to notify the driver about the possible empty spot.

FIG. 3 shows how the new empty space is marked, the start position of the new entity is stored where the car was detected upon being turned on, and that position is used to notify the driver about the possible empty spot.

The empty spaces will be marked if the new entity is detected inside of the C2C transmission range because, if a new entity is detected near to the transmission range limit, this doesn't necessarily mean that the car was turned on recently. Instead, it could indicate that a vehicle has just driven into V2X range, which could give a false expectation of an empty space without either tracking the location, as discussed above, and/or determining whether the vehicle from which V2X signals have started to be received is close to the V2X reception range limit of the car seeking a parking spot.

By these mechanisms the system will analyze other vehicle positions to find possible future empty parking spaces.

Figure 4:
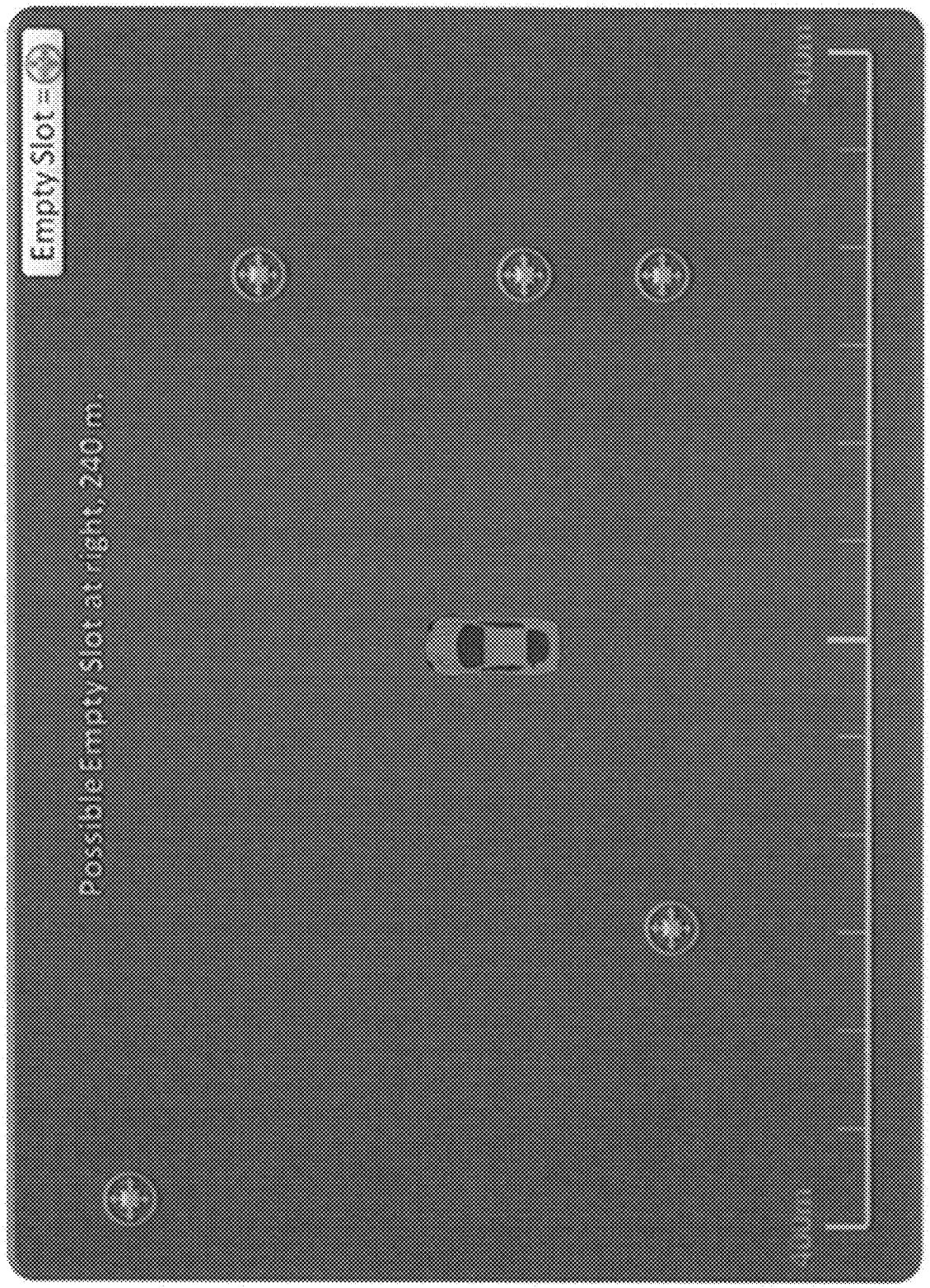
FIG. 4 depicts an example HMI for displaying to a driver where a possible available parking spot will be.

The system will tell the driver where a possible spot will be unoccupied through a visual sign in a HMI, such as the example HMI shown in FIG. 4, giving to the user the relative direction and distance of the position of the spot based on the current position. The position will be analyzed and the final parking space may be shown in a relative direction based on the actual position (e.g. "Empty Slot at right 240 m"). The system not only will notify the driver the nearest empty spot, but additionally the system may create a virtual map with all possible empty spots, and such a map could be displayed in the HMI.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

The invention claimed is:

1. A method of assisting a driver of a first vehicle to find an empty parking space, the method comprising:
    receiving at the first vehicle V2V communications from at least one other vehicle within a parking area of interest for the first vehicle;
    analyzing the received V2V communications from the at least one other vehicle to determine potential available parking spaces in the parking area of interest, wherein analyzing the received V2V communications from the at least one other vehicle to determine potential available parking spaces in the parking area of interest comprises determining when the at least one other vehicle has started to broadcast its V2V signals to thereby identify vehicles that are likely candidates to leave their current parking spaces;
    displaying on a display in the first vehicle one or more available parking spaces in the parking area of interest;
    wherein the V2V communications comprise dedicated short-range communications (DSRC) technology; and
    wherein the DSRC technology includes broadcasting a basic safety message (BSM) up to ten times per second, each BSM indicating a vehicle location, a vehicle heading, and a vehicle speed of the vehicle transmitting the BSM.

2. The method of claim 1, wherein analyzing the received V2V communications from the at least one other vehicle to determine potential available parking spaces in the parking area of interest further comprises determining which areas have a higher concentration of drivers looking for a parking spot, which results in a relatively lower probability of actually finding an available parking space in those areas.

3. The method of claim 1, wherein analyzing the received V2V communications from the at least one other vehicle to determine potential available parking spaces in the parking area of interest further comprises removing available parking spots upon detecting that another vehicle is waiting to park near an otherwise available parking spot.

4. The method of claim 3, further comprising displaying on the display in the first vehicle areas that have a lower concentration of drivers looking for a parking spot as compared to other areas in the parking area of interest.

5. The method of claim 1, wherein analyzing the received V2V communications from the at least one other vehicle to determine potential available parking spaces in the parking area of interest further comprises determining whether the at least one other vehicle was not moving when the at least one vehicle started to broadcast its V2V signals thereby resulting in a higher likelihood that the at least one vehicle was in a parking spot when it started to broadcast its V2V signal.

6. The method of claim 1, wherein analyzing the received V2V communications from the at least one other vehicle to determine potential available parking spaces in the parking area of interest further comprises determining whether the at least one other vehicle was moving when the at least one vehicle started to broadcast its V2V signals thereby resulting in a lower likelihood that the at least one vehicle was in a parking spot when it started to broadcast its V2V signal.

7. The method of claim 1, wherein analyzing the received V2V communications from the at least one other vehicle to determine potential available parking spaces in the parking area of interest further comprises determining whether the at least one other vehicle was almost out of V2V range when V2V signals were first received from the at least one vehicle thereby resulting in a lower likelihood that the at least one vehicle was in a parking spot when it started to broadcast its V2V signal.

8. The method of claim 1, wherein analyzing the received V2V communications from the at least one other vehicle to determine potential available parking spaces in the parking area of interest further comprises determining whether the at least one other vehicle was not almost out of V2V range when V2V signals were first received from the at least one vehicle thereby resulting in a higher likelihood that the at least one vehicle was in a parking spot when it started to broadcast its V2V signal.

\* \* \* \* \*